(12) United States Patent
Marion

(10) Patent No.: US 6,741,787 B2
(45) Date of Patent: May 25, 2004

(54) PROCESS AND DEVICE FOR CONNECTION/DISCONNECTION OF AN OPTICAL FIBER WITH AN OPTOELECTRONIC COMPONENT

(75) Inventor: François Marion, St. Egreve (FR)

(73) Assignee: Commissariat a l'Energie Atomique, Paris (FR)

( * ) Notice: Subject to any disclaimer, the term of this patent is extended or adjusted under 35 U.S.C. 154(b) by 0 days.

(21) Appl. No.: 10/265,367

(22) Filed: Oct. 7, 2002

(65) Prior Publication Data

US 2003/0128953 A1 Jul. 10, 2003

(30) Foreign Application Priority Data

Oct. 18, 2001 (FR) .............................. 01 13434

(51) Int. Cl.[7] .............................................. G02B 13/44
(52) U.S. Cl. ...................................................... 385/137
(58) Field of Search ............................ 385/137, 39, 52, 385/51, 88, 89, 91

(56) References Cited

U.S. PATENT DOCUMENTS

| | | | |
|---|---|---|---|
| 4,232,934 A | 11/1980 | Feinbloom | 385/88 |
| 5,177,807 A * | 1/1993 | Avelange et al. | 385/91 |
| 5,210,811 A * | 5/1993 | Avelange et al. | 385/91 |
| 5,570,444 A * | 10/1996 | Janssen et al. | 385/90 |
| 5,631,989 A * | 5/1997 | Koren et al. | 385/91 |
| 6,360,043 B1 * | 3/2002 | Bostock et al. | 385/49 |
| 6,516,130 B1 * | 2/2003 | Jang | 385/136 |
| 6,565,266 B2 * | 5/2003 | Mun et al. | 385/88 |

FOREIGN PATENT DOCUMENTS

EP    0 335 367    10/1989

OTHER PUBLICATIONS

J. Holm, et al., Sensors and Actuators, vol. 82, pp. 245–248, "Through–Etched Silicon Carriers for Passive Alignment of Optical Fibers to Surface–Active Optoelectronic Components", 2000.

* cited by examiner

*Primary Examiner*—Tulsidas C. Patel
(74) *Attorney, Agent, or Firm*—Oblon, Spivak, McClelland, Maier & Neustadt, P.C.

(57) ABSTRACT

The invention relates to a device and a process for connecting at least one optical fiber (F) with an optoelectronic component. The device comprises at least one housing (8) provided with at least one mobile arm (9, 10), the housing comprising:

a first zone (Z1) to insert the fiber into the housing without applying any pressure on the mobile arm, the first zone being delimited by a part of the wall of the housing and by the mobile arm, and a second zone (Z2) to fix the fiber in the housing after pressure is exerted by the fiber on the mobile arm.

The invention is applicable to any type of connection between an optical fiber and an optoelectronic component such as a photo-emitter, photo-detector, wave guide, etc.

22 Claims, 6 Drawing Sheets

PROCESS AND DEVICE FOR CONNECTION/DISCONNECTION OF AN OPTICAL FIBER WITH AN OPTOELECTRONIC COMPONENT

DESCRIPTION

Technical Field and Prior Art

This invention relates to a process and a device for connecting/disconnecting an optical fiber with an optoelectronic component.

The process according to the invention aligns at least one optical fiber and at least one optoelectronic component in order to make a high precision assembly. This assembly may be temporary.

The optoelectronic component may be a photo-emitter, a photo-detector, another fiber, a wave guide network, and more generally any optical or electrical circuit that can be connected to an optical fiber.

Different techniques are known in prior art to align and assemble an optical fiber with an optoelectronic component. The most frequently used techniques are broken down into two distinct groups, namely "active" techniques and "passive" techniques.

In an "active" technique, the alignment of the optical fiber and the optoelectronic component is done in two steps. In the first step, the optical fiber and the optoelectronic component are aligned with each other approximately. In a second step, the optical fiber and the optoelectronic component are powered to check that they actually work (optical and/or electrical supply). The precise alignment between the fiber and the component is then made by optimizing optical and/or electrical measurements. Once the optimum position has been found, the fiber and the component are fixed to each other by bonding, soldering or any other known means of mechanical support. For example, it is thus possible to align an optical fiber and a laser by measuring the light output from the laser that is coupled in the fiber.

In a "passive" technique, the components to be aligned include self-alignment means. For example, this is the case for the self-alignment method using solder beads, commonly called the "flip-chip" method.

Figure 1:
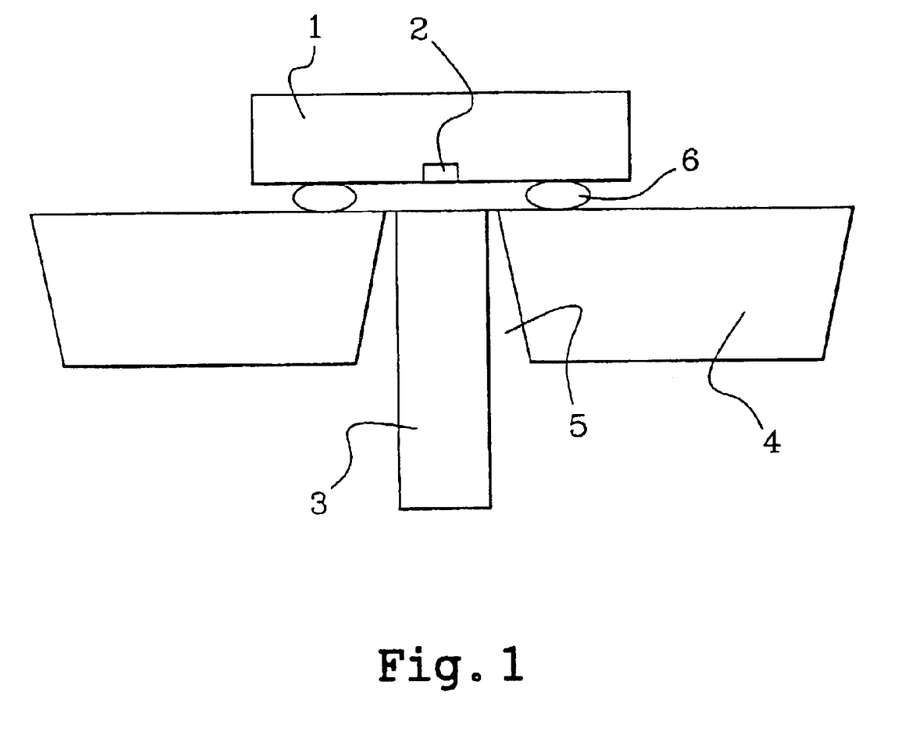
FIG. 1 shows an optical fiber connection device with an optoelectronic component according to prior art.

FIG. 1 shows a principle diagram for the self-alignment device according to prior art described in the document entitled "Through-etched silicon carriers for passive alignment of optical fibers to surface-active optoelectronic components" (Sensors and Actuators 82 (2000), 245-248).

The device in FIG. 1 comprises an optoelectronic component 1 provided with an access port 2, an optical fiber 3 to be aligned with the access port 2, a plate 4 through which a conical hole 5 is drilled and solder beads 6.

The alignment between the fiber 3 and the access port 2 is made by inserting the fiber in the conical hole 5. The conical shape of the hole facilitates alignment between the fiber and the access port.

However, there are several disadvantages related to this technique. Firstly, it is relatively difficult to make the hole conical and the alignment precision is not as good: the precision is lower as the taper increases. Furthermore, there is no force to hold the fiber in place once the fiber has been inserted in the hole. The fiber then has to be fixed by bonding and held in place mechanically during bonding.

The invention does not have the disadvantages mentioned above.

PRESENTATION OF THE INVENTION

The invention relates to a device for connecting at least one optical fiber with an optoelectronic component. The device comprises at least one housing provided with at least one mobile arm, the housing comprising:
- a first zone to insert the fiber into the housing without applying any pressure on the mobile arm, the first zone being delimited by a part of the wall of the housing and by the mobile arm, and
- a second zone to fix the fiber in the housing after pressure is exerted by the fiber on the mobile arm.

The invention also relates to a process for connection of at least one optical fiber with an optoelectronic component. The process comprises the following steps in sequence:
- the fiber is inserted in a first zone of a housing in which there is at least one mobile arm, the fiber being inserted without applying any pressure on the mobile arm(s),
- the fiber is moved towards one end of the mobile arm(s),
- the optical fiber applies pressure to the end of the mobile arm(s) such that the mobile arm(s) (is) are eventually fixed in a fiber retention position in a second zone (Z2) of the housing.

The invention also relates to an attachment structure for a connector fitted with optical fibers to an optoelectronic component, the connector comprising at least one guide pin. The structure comprises at least one housing provided with at least one mobile arm, the housing comprising:
- a first zone to insert the guide pin into the housing without applying any pressure on the mobile arm, the first zone being delimited by a part of the wall of the housing and by the mobile arm, and
- a second zone to fix the guide pin in the housing after pressure is applied by the guide pin on the mobile arm.

The invention also relates to a process for attachment of a connector equipped with optical fibers to a microelectronic component, the connector comprising at least one guide pin. The process comprises the following steps in sequence:
- the guide pin is inserted in a first zone of a housing provided with at least one mobile arm, the guide pin being inserted without applying any pressure on the mobile arm(s),
- the guide pin is moved towards one end of the mobile arm(s),
- the guide pin applies pressure to the end of the mobile arm(s) such that the mobile arm(s) (is) are eventually fixed in a guide pin retention position in a second zone (Z2) of the housing.

BRIEF DESCRIPTION OF THE FIGURES

Other characteristics and advantages of the invention will become clear after reading the preferred embodiments of the invention with reference to the attached figures including.

The same marks denotes the same elements on all figures.

DETAILED DESCRIPTION OF EMBODIMENTS OF THE INVENTION

Figure 2A:
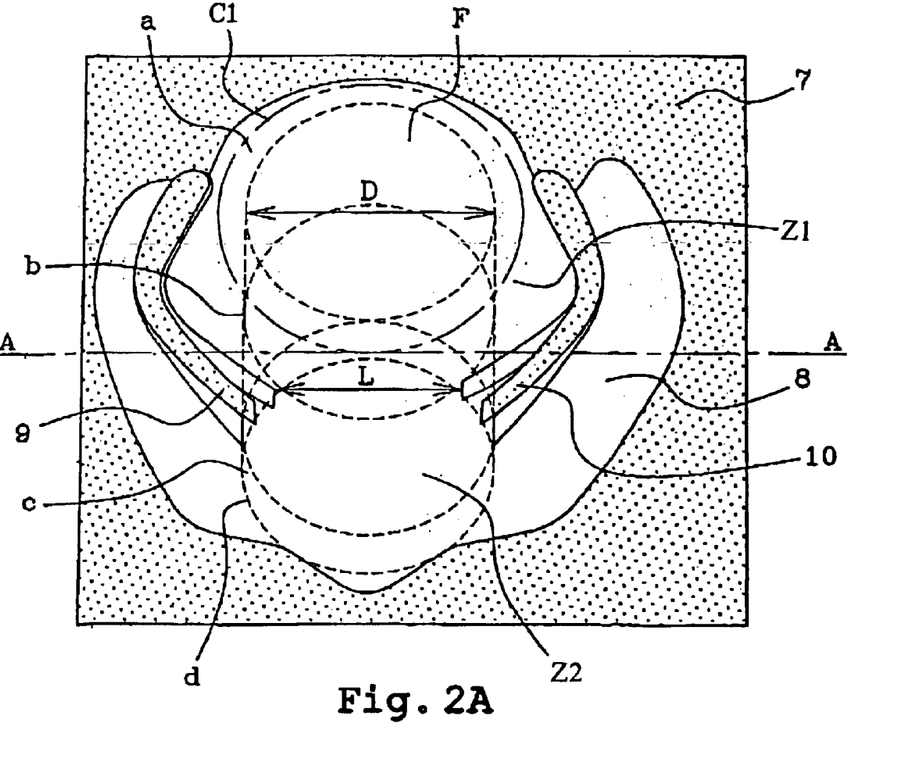
FIGS. 2A and 2B show a top view and a sectional view respectively of a device for connection of an optical fiber with an optoelectronic component according to a first embodiment of the invention.
Figure 2B:
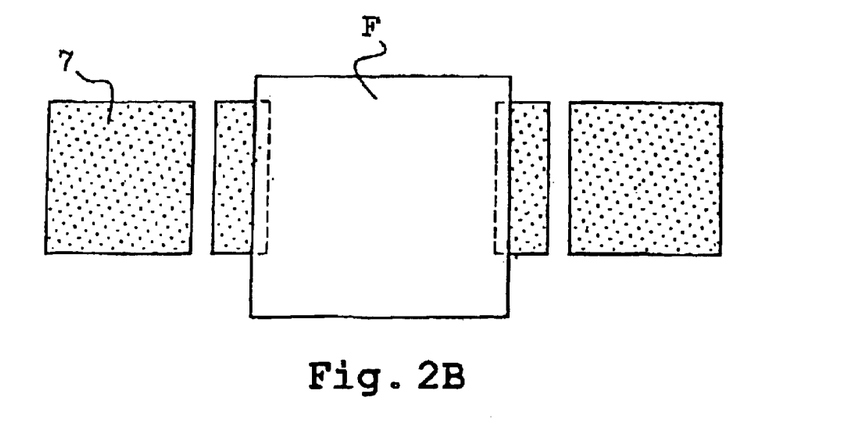

FIG. 2A shows a top view of a device for connection of an optical fiber with an optoelectronic component according to a first embodiment of the invention. FIG. 2B shows a view along section A—A in FIG. 2A.

The connection device is composed of a mechanical part 7, for example made of silicon, in which a housing 8 is formed. The housing 8 comprises two mobile arms 9 and 10, for example micro mechanical spring arms made of silicon. The mobile arms 9 and 10 define two zones Z1, Z2 in the housing 8. A first zone Z1 is delimited by part of the wall of the housing 8 and by mobile arms 9 and 10 on which no pressure is exerted. Zone Z1 is the zone in which the fiber is inserted in the housing 8. A second zone Z2 is defined as being the zone of the housing 8 in which the fiber is immobilized in a retention position after the fiber has applied pressure onto the ends of the mobile arms. When no pressure is applied to the mobile arms 9 and 10, the distance L that separates their ends is less than diameter D of the fiber.

The process for attachment of a fiber in the connection device comprises the following steps:

the fiber is inserted in the first zone Z1 if no pressure is exerted on the mobile arm (position a in FIG. 2A), the optical fiber moves towards the end of the mobile arms 9 and 10 so that the fiber comes into contact with these ends (position b on FIG. 2A), the fiber applies pressure on the ends of the arms 9 and 10 so as to move the arms away from each other (position C on FIG. 2A), the pressure exerted by the fiber on the ends of the arms 9 and 10 continues such that the mobile arms are eventually fixed in place in a fiber retention position.

As a non-restrictive example, the first zone Z1 into which the fiber F is inserted is at least a zone in which the diameter of the contour C1 is 140 $\mu$m for an optical fiber with a diameter of 125 $\mu$m.

It is obvious that the fiber can be removed by making a movement opposite to the movement described above, and then reinserted once again as many times as necessary. If there is no need to remove the fiber after it has been inserted, the assembly can be solidified, for example using an epoxy glue cross-linked by UV.

Figure 3A:
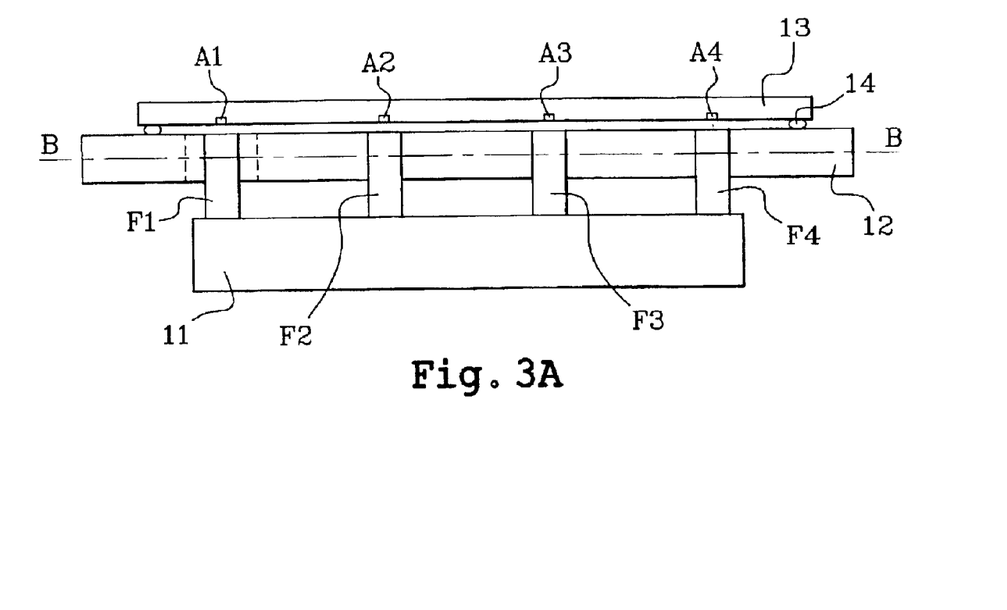
FIGS. 3A and 3B show a top view and a sectional view respectively of a device for connection of an optical fiber ribbon with an optoelectronic device.
Figure 3B:
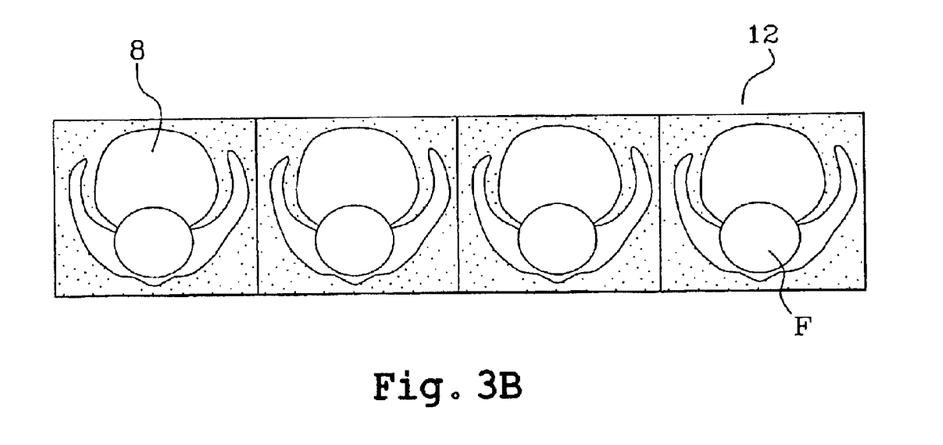

FIG. 3A shows a top view of a device for connection of an optical fiber ribbon with an optoelectronic device. FIG. 3B shows a view along section B—B in FIG. 3A.

Four optical fibers F1, F2, F3, F4 installed on a ribbon 11 are connected to the corresponding access ports A1, A2, A3, A4 in an optoelectronic device 13. A connection device 12 comprises four elementary connection devices like that shown on FIGS. 2A and 2B. Each elementary connection device can be used to align an optical fiber with an access port (see FIG. 3B). Solder beads 14 fix the connection device 12 to the optoelectronic device 13.

Preferably, the connection device 12 is composed of a silicon board and the housings 8 are made collectively by etching in the silicon plate (plasma, chemical, etc.).

Figure 4A:
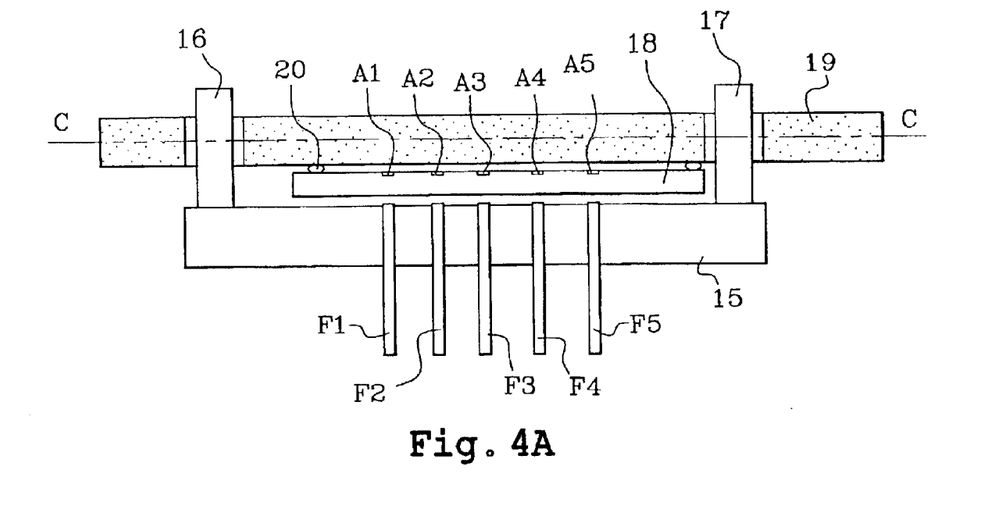
FIGS. 4A and 4B show a top view and a sectional view respectively of a structure for a connection between an optical connector fitted with guide pins and an optoelectronic device.
Figure 4B:
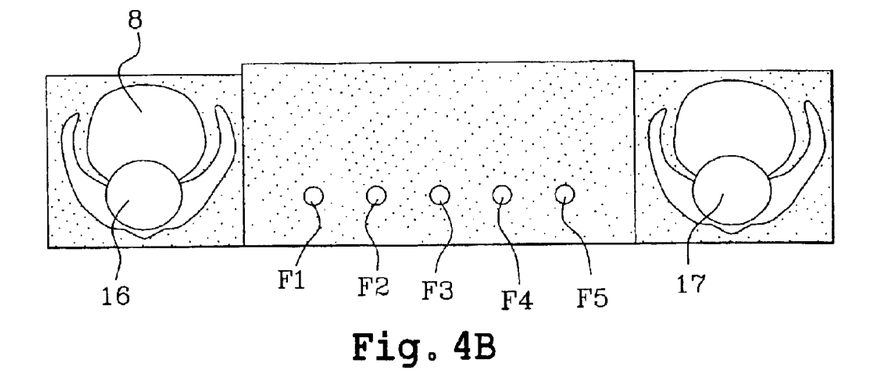

FIG. 4A shows a top view of a structure for the attachment of a connector fitted with optical fibers to an optoelectronic component. FIG. 4B shows a view along section C—C in FIG. 4A.

A connector 15 equipped with optical fibers F1, F2, F3, F4, F5, for example an MT (Mechanically Transferable) connector is inserted in a silicon plate 19 using guide pins 16, 17. Each guide pin 16, 17 is fixed to the silicon plate by a connection device according to the invention. An optoelectronic component 18 provided with access ports A1, A2, A3, A4, A5 is fixed on one face of the silicon plate 19 by solder beads 20. The optoelectronic component 18 is placed between the guides pin 16 and 17 such that the optical fibers F1, F2, F3, F4, F5 are aligned with the corresponding ports A1, A2, A3, A4, A5. Due to the precision of the connection according to the invention, the optical fibers F1, F2, F3, F4, F5 are aligned almost perfectly with the corresponding access ports A1, A2, A3, A4, A5.

Figure 5:
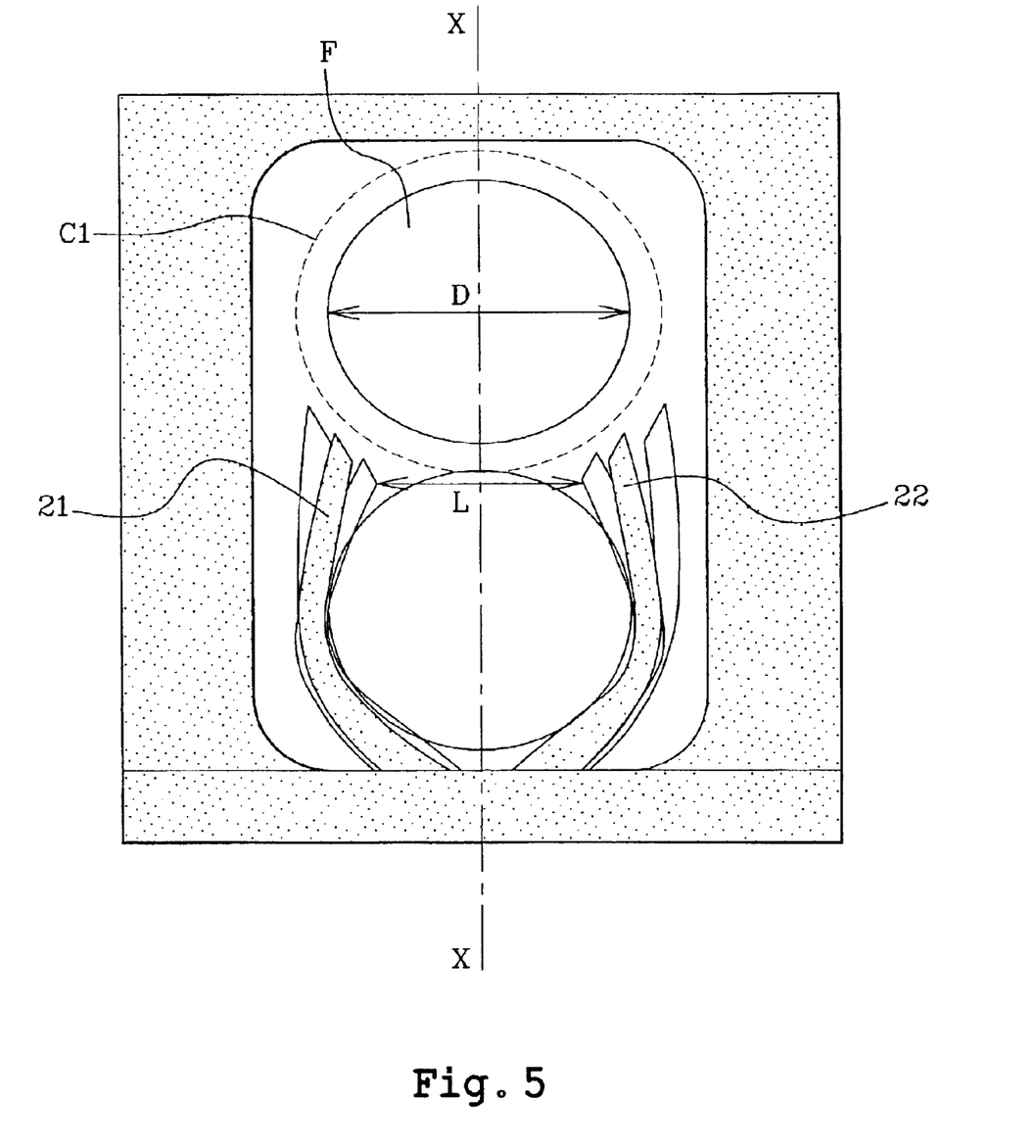
FIG. 5 shows a device for connection of an optical fiber with an optoelectronic component according to a second embodiment of the invention.

FIG. 5 shows a device for connection of an optical fiber with an optical electronic component according to a second embodiment of the invention.

The connection device according to the second embodiment of the invention comprises two mobile arms 21 and 22 positioned symmetrically with respect to an axis XX'. The attachment position of the optical fiber is then such that the fiber is held in place between the mobile arms 21 and 22.

Figure 6:
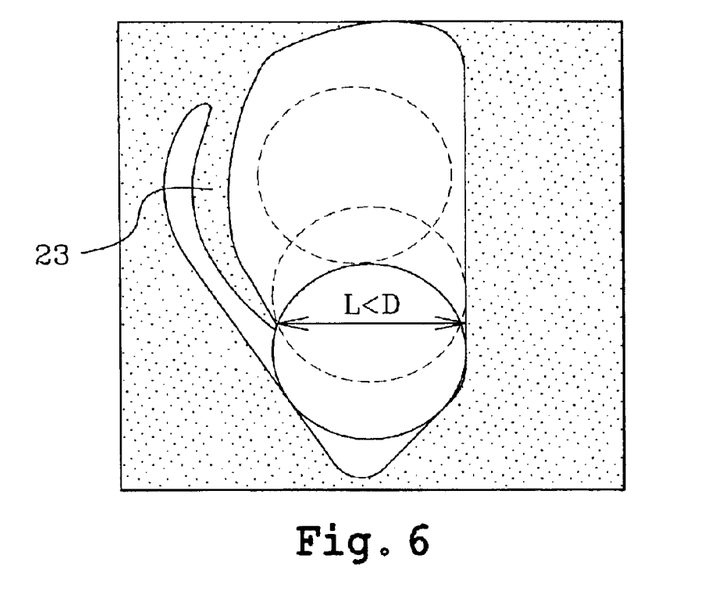
FIG. 6 shows a device for connection of an optical fiber with an optical component according to a third embodiment of the invention.

FIG. 6 shows an optical fiber connection device with an optoelectronic component according to a third embodiment of the invention.

In this case, the device according to the invention comprises a single mobile arm 23. In this case the zone in which the fiber is held in the housing (Z2) is delimited by one end of the mobile arm 23 and by a part of the wall of the housing.

Figure 7:
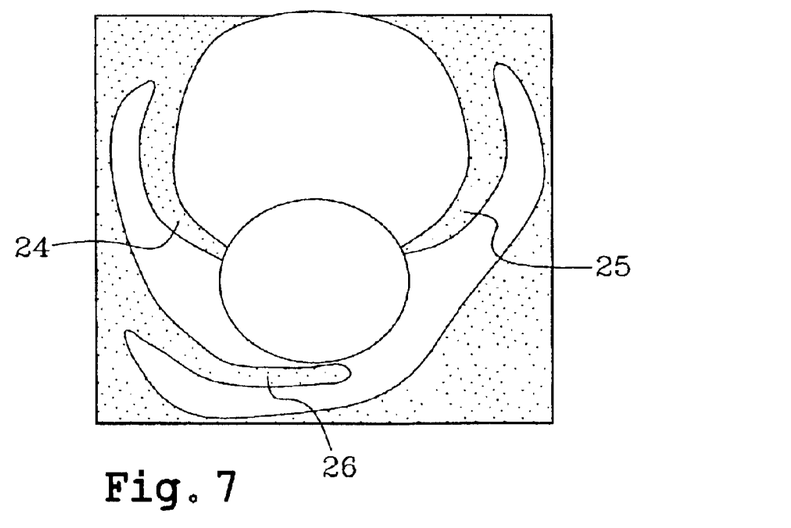
FIG. 7 shows a device for connection of an optical fiber with an optoelectronic component according to a fourth embodiment of the invention.

FIG. 7 shows a device for the connection of an optical fiber with an optoelectronic component according to a fourth embodiment of the invention.

In this case fiber F is held in place by three mobile arms 24, 25 and 26. The first zone Z1 is delimited by part of the wall of the housing and by two of the mobile arms 24 and 25. The second zone Z2 is delimited by the ends of the two mobile arms 24 and 25 on which the fiber is applied by pressure and by the body of the third mobile arm 26 on which the fiber applies pressure. This embodiment advantageously keeps the fiber F simply supported. Another advantage is that the fiber alignment does not depend on variations in the silicon etching dimensions.

Advantageously, all optical couplings may be made using connection devices according to the invention; Fiber/VCSEL (Vertical Cavity Surface Emitting Laser) coupling, fiber/fiber coupling, fiber/detector coupling, fiber/wave guide coupling. All electro-optic tests may also be made easily, before the components are fixed permanently. Optical fiber inputs are then used to simulate the final assembly.

What is claimed is:

1. Attachment structure for a connector fitted with optical fibers to an optoelectronic component, the connector comprising at least one guide pin, the structure comprising:

at least one housing provided with at least one mobile arm, the housing comprising:

a first zone to insert the guide pin into the housing without applying any pressure on the mobile arm, the first zone being delimited by a part of the wall of the housing and by the mobile arm, and a second zone to fix the guide pin in the housing after pressure is applied by the guide pin on the mobile arm.

2. Attachment structure according to claim 1, wherein the housing contains a single mobile arm and the second zone is delimited by the end of the mobile arm and by a part of the wall of the housing.

3. Attachment structure according to claim 1, wherein the housing contains two mobile arms and the second zone is delimited by the ends of the two mobile arms and a part of the wall of the housing.

4. Attachment structure according to claim 1, wherein the housing contains two mobile arms and the second zone is delimited by the body of the mobile arms in which the guide pin is inserted and a part of the wall of the housing.

5. Attachment structure according to claim 1, wherein the housing contains three mobile arms, the first zone is delimited by a part of the wall of the housing and by two mobile arms among the three mobile arms, and the second zone is delimited by the said ends of the two mobile arms and by the body of the third mobile arm on which the guide pin bears.

6. Structure according to claim 1, wherein the structure is made with silicon and the mobile arms are of the micro mechanical spring type made with silicon.

7. Process for attachment of a connector equipped with optical fibers to an optoelectronic component, the connector comprising at least one guide pin, the process comprising in sequence:
inserting the guide pin in a first zone of a housing provided with at least one mobile arm, the guide pin being inserted without applying any pressure on the at least one mobile arm,
moving the guide pin towards one end of the at least one mobile arm,
wherein the guide pin applies pressure to the end of the at least one mobile arm such that the at least one mobile arm is eventually fixed in a guide pin retaining position in a second zone of the housing.

8. Device for connecting at least one optical fiber with an optoelectronic component, comprising:
at least one housing provided with at least one mobile arm; the at least one housing comprising:
a first zone to insert the fiber into the housing without applying any pressure on the at least one mobile arm, the first zone being delimited by a part of the wall of the at least one housing and by the at least one mobile arm, and
a second zone to fix the fiber in the housing after pressure is exerted by the fiber on the at least one mobile arm,
said first and second zones having a common cross-section plane which is a plane through which said optical fiber is inserted in said at least one housing, said optical fiber having an axis approximately perpendicular to said cross-section plane when inserted in said at least one housing.

9. Connection device according to claim 8, wherein the at least one housing contains one mobile arm, and the second zone is delimited by one end of the mobile arm and by a part of the wall of the at least one housing.

10. Connection device according to claim 8, wherein the at least one housing comprises two mobile arms and the second zone is delimited by the ends of the two mobile arms and part of the wall of the at least one housing.

11. Connection device according to claim 8, wherein the at least one housing comprises two mobile arms and the second zone is delimited by the body of the two mobile arms in which the fiber is inserted and part of the wall of the at least one housing.

12. Connection device according to claim 8, wherein the at least one housing contains three mobile arms and the first zone is delimited by a part of the wall of the at least one housing and by two of the mobile arms and the second zone is delimited by the ends of two of the said mobile arms and by the body of a third mobile arm on which the optical fiber applies pressure.

13. Device according to claim 8, comprised of silicon and at least one of the mobile arms is of the micro-mechanical spring type and is made at least in part of silicon.

14. Process for connection of at least one optical fiber with an optoelectronic component, comprising:
inserting a fiber in a first zone of a housing in which there is at least one mobile arm, the fiber being inserted without applying any pressure on the at least one mobile arm,
moving the fiber toward an end of the at least one mobile arm,
applying pressure by the optical fiber to the end of the at least one mobile arm such that the at least one mobile arm is eventually fixed in a fiber retention position in a second zone of the housing,
said first and second zones having a common cross-section plane which is a plane through which said optical fiber is inserted in said housing, said optical fiber having an axis approximately perpendicular to said cross-section plane when inserted in said housing.

15. Connection process according to claim 14, further comprising the fiber inside the second zone of the housing using glue.

16. Attachment structure for a connector fitted with optical fibers to an optoelectronic component, the connector comprising at least one guide pin, wherein the structure conspires:
at least one housing provided with at least one mobile arm, the at least one housing comprising:
a first zone to insert the guide pin into the at least one housing without applying any pressure on the at least one mobile arm, the first zone being delimited by a part of the wall of the at least one housing and by the at least one mobile arm, and
a second zone to fix the guide pin in the at least one housing after the pressure is applied by the guide pin on the at least one mobile arm,
said first and second zones having a common cross-section plane which is a plane through which said guide pin is inserted in said at least one housing, said guide pin having an axis approximately perpendicular to said cross-section plane when inserted in said at least one housing.

17. Attachment structure according to claim 16, wherein the at least one housing contains one mobile arm and the second zone is delimited by the end of the mobile arm and by a part of the wall of the at least one housing.

18. Attachment structure according to claim 16, wherein the at least one housing contains two mobile arms and the second zone is delimited by the end of the two mobile arms and a part of the wall of the at least one housing.

19. Attachment structure according to claim 16, wherein the at least one housing contains two mobile arms and the second zone is delimited by a body portion of the two mobile arms in which the guide pin is inserted and a part of the wall of the at least one housing.

20. Attachment structure according to claim 16, wherein the at least one housing contains three mobile arms,
the first zone is delimited by a part of the wall of the at least one housing and by two mobile arms among the three mobile arms, and the second zone is delimited by the said ends of the two mobile arms and by the body of the third mobile arm on which the guide pin bears.

21. Attachment structure according to claim 16, wherein the structure is comprised of silicon and the mobile arms are of the micro-mechanical spring type and are made at least in part of silicon.

22. Process for attachment of a connector equipped with optical fibers to an optoelectronic component, the connector comprising at least one guide pin, the process comprising:

inserting the guide pin in a first zone of a housing provided with at least one mobile arm, the guide pin being inserted without applying any pressure on the at least one mobile arm;

moving the guide pin toward one end of the at least one mobile arm;

applying pressure using the guide pin to the end of the at least one mobile arm such that the at least one mobile arm is eventually fixed in a guide pin retaining position in a second zone of the housing;

said first and second zones having a common cross-section plane which is a plane through which said guide pin is inserted in said housing, said guide pin having an axis approximately perpendicular to said cross-section plane when inserted in said housing.

* * * * *